(12) United States Patent
Dean et al.

(10) Patent No.: US 10,655,786 B1
(45) Date of Patent: May 19, 2020

(54) ELECTRONIC PRESSURE GAUGE FOR PRESSURIZED SYSTEM WITH VARIABLE OUTLET FLOWS

(71) Applicant: Essex Industries, Inc., St. Louis, MO (US)

(72) Inventors: William C. Dean, Valley Park, MO (US); Matthew Zeid, Ballwin, MO (US); Russell Jacobsmeyer, Labadie, MO (US)

(73) Assignee: Essex Industries, Inc., St. Louis, MO (US)

( * ) Notice: Subject to any disclaimer, the term of this patent is extended or adjusted under 35 U.S.C. 154(b) by 19 days.

(21) Appl. No.: 15/378,824

(22) Filed: Dec. 14, 2016

Related U.S. Application Data

(60) Provisional application No. 62/311,189, filed on Mar. 21, 2016.

(51) Int. Cl.
*F17C 13/02* (2006.01)
*G01F 1/56* (2006.01)
(Continued)

(52) U.S. Cl.
CPC ............ *F17C 13/025* (2013.01); *F16K 3/085* (2013.01); *F16K 3/32* (2013.01); *F16K 5/103* (2013.01); *F16K 37/005* (2013.01); *F16K 37/0041* (2013.01); *F17C 13/023* (2013.01); *F17C 13/026* (2013.01); *F17C 13/028* (2013.01); *G01F 1/56* (2013.01); *G01F 9/008* (2013.01); *F17C 2201/0119* (2013.01); *F17C 2201/032* (2013.01); *F17C 2205/0338* (2013.01); *F17C 2221/011* (2013.01); *F17C 2250/032* (2013.01);
(Continued)

(58) Field of Classification Search
CPC .... F16K 37/005; F16K 37/0041; F16K 3/085; F16K 3/32; F16K 5/103; Y10T 137/8326; Y10T 137/8175; Y10T 137/8242; F17C 2221/011; F17C 13/025; F17C 2250/032; F17C 2250/036
See application file for complete search history.

(56) References Cited

U.S. PATENT DOCUMENTS 3,469,225 A * 9/1969 Wood ..................... H01C 10/14
338/163
5,841,428 A * 11/1998 Jaeger ................. G02F 1/13306
345/184
(Continued)

FOREIGN PATENT DOCUMENTS

WO 2015110717 A1 7/2015
WO 2015110718 A1 7/2015

OTHER PUBLICATIONS

Air Liquide webpage: "Takeo, an innovation in oxygen therapy," Wayback Machine website as saved from Mar. 23, 2015, http://www.airliquide.com/en/our-offer/air-liquide-healthcare/medical-gases/takeo-an-innovation-in-oxygen-therapy.html, printed on Mar. 28, 2017 (1 page).

(Continued)

*Primary Examiner* — Atif H Chaudry
(74) *Attorney, Agent, or Firm* — Lewis Rice LLC

(57) ABSTRACT

A pressure gauge system for a tank with a variable flow rate that provides a user with an indication of how much usable time is left in a pressurized gas tank given a particular selected flow rate or operational condition and what pressure of gas is left in the tank.

16 Claims, 13 Drawing Sheets

(51) Int. Cl.
*G01F 9/00* (2006.01)
*F16K 3/32* (2006.01)
*F16K 37/00* (2006.01)
*F16K 3/08* (2006.01)
*F16K 5/10* (2006.01)

(52) U.S. Cl.
CPC .. *F17C 2250/034* (2013.01); *F17C 2250/036* (2013.01); *F17C 2250/043* (2013.01); *F17C 2250/0439* (2013.01); *F17C 2250/0473* (2013.01); *F17C 2250/0491* (2013.01); *F17C 2270/025* (2013.01); *Y10T 137/8175* (2015.04); *Y10T 137/8242* (2015.04); *Y10T 137/8326* (2015.04)

(56) References Cited

U.S. PATENT DOCUMENTS

| | | | | |
|---|---|---|---|---|
| 6,021,652 | A * | 2/2000 | Walker | D06F 43/00 137/554 |
| 6,244,540 | B1 | 6/2001 | Stabile et al. | |
| 7,104,124 | B2 | 9/2006 | Stabile et al. | |
| 8,047,079 | B2 | 11/2011 | Bleys et al. | |
| 8,550,114 | B2 | 10/2013 | Levine et al. | |
| 9,273,799 | B2 | 3/2016 | Fowler et al. | |
| 9,599,285 | B2 | 3/2017 | Fowler et al. | |
| 9,816,642 | B2 | 11/2017 | Fowler et al. | |
| 2002/0167869 | A1 * | 11/2002 | Masuda | G04C 3/14 368/238 |
| 2008/0150739 | A1 | 6/2008 | Gamard | |
| 2010/0180892 | A1 | 7/2010 | Downie | |
| 2010/0180982 | A1 | 7/2010 | Huntington et al. | |
| 2013/0060491 | A1 | 3/2013 | Valenzano | |
| 2013/0060492 | A1 | 3/2013 | Stabile, Jr. et al. | |
| 2014/0130875 | A1 * | 5/2014 | Fowler | F16K 37/005 137/1 |
| 2014/0151589 | A1 * | 6/2014 | Cox | G01D 5/145 251/129.1 |
| 2015/0136234 | A1 * | 5/2015 | Zulfiquar | F17D 5/02 137/1 |
| 2016/0341364 | A1 * | 11/2016 | Carron | F17C 13/025 |

OTHER PUBLICATIONS

Webpage: "LIV IQ at a glance," http://www.liv-iq.com/en/about_liv_iq/liv_iq_at_a_glance/index.html, printed on Mar. 28, 2017 (1 page).

Video: "Aeronautical Data Systems Oxygen Management Overview," from WordCraft Marketing, http://vimeo.com/43032929, screenshot printed on Mar. 28, 2017 (1 page).

James Stabile, LinkedIn website: https://www.linkedin.com/in/james-stabile-542a2036/, printed on Mar. 28, 2017 (3 pages).

ADS, Aeronautical Data Systems, Inc. webpage: "T-PO SmartGuarge," Wayback Machine website as saved from Aug. 25, 2016, https://web.archive.org/web/20160825173305/http://adsopp.com/products-and-services/t-po-smartgauge.html, printed on Mar. 28, 2017 (1 page).

International Search Report, International Patent Application No. PCT/US2017/023406, dated Jun. 16, 2017 (18 pages).

Supplementary European Search Report, European Application No. EP 17770986, dated Nov. 5, 2019 (10 pages).

* cited by examiner

ELECTRONIC PRESSURE GAUGE FOR PRESSURIZED SYSTEM WITH VARIABLE OUTLET FLOWS

CROSS-REFERENCE TO RELATED APPLICATIONS

This application claims benefit of U.S. Provisional Patent Application No. 62/311,189, filed Mar. 21, 2016, the entire disclosure of which incorporated herein by reference.

BACKGROUND OF THE INVENTION

Field of the Invention

This disclosure is related to the field of regulator systems for providing an indication of the amount of a gas remaining in a storage vessel. In particular, it relates to an electronic regulator system and gauge for indicating the amount of time that the gas in a pressurized storage tank will continue to flow from the vessel at a particular flow rate.

Description of the Related Art

Oxygen is one of the most widely produced gases in the world. It is used in industrial processes such as welding and plasma chemistry, laser cutting, and fish farms. It is also used for medical purposes in hospitals for both civilian and military environments. In most hospitals and medical facilities, oxygen can be provided to patients from one of two sources. The primary source is directly from hookups in a patient's room. These allow for a patient in a confined location (usually a hospital bed) to have an essentially constant source of oxygen. As in-room connections are generally connected to very large oxygen storage systems or generators that serve the entire facility, there is little concern that any individual patient's oxygen use will deplete the source. Thus, there is generally no need for hospital personnel to monitor an individual patient's oxygen use to make sure they do not use more than is available.

In other medical situations, however, it is necessary to provide an oxygen source which is specific to the patient and can be readily physically transported with the patient. Typically, this is a relatively small pressurized oxygen tank that can either be held or carried by the patient, or can be readily transported with a patient on a wheeled hospital bed or in a wheelchair. As these tanks are specifically geared for shorter uses and specific needs, they usually have a specific (and much smaller) volume of available gas, the use of which needs to be monitored. Such tanks are also commonplace in ambulances which can lack the infrastructure to provide a more built-in supply as well as nursing homes and private residences.

A mobile oxygen tank for use while transporting a patient will generally have enough gas for transportation of a number of patients as most patients will only require the tank for a relatively short period of time when moving between locations. Each tank will generally be used to transport a first patient occupying the bed or wheelchair (or other method of transportation, such as an ambulance) and will then remain with the bed or wheelchair, to be used with the next patient to occupy that bed or wheelchair. In this way, the tank is always available to a patient that would need it. One concern with such tanks, however, is that they always need to be ready for immediate use by a patient. Thus, when the pressure of oxygen in the tank gets low enough where there may not be sufficient gas remaining to meet the needs of the next patient, the tank generally needs to be replaced with a full tank. The low pressure tank is then sent to be refilled or replaced.

The amount of time it will take to deplete the oxygen in the tank is variable as higher and lower flow rates may be used for different patients. Thus, it can be difficult to estimate how much oxygen is left in the tank. To deal with the problem, gauge systems have typically been used that indicate how much oxygen remains in the tank. Because an oxygen tank is stored under pressure, the readings have typically been related to the pressure inside the tank.

Specifically, prior gauges comprised the observation of pressure from a spiral wound spring gauge with a pointer attached to its end. When the tank is initially pressurized, the coiled spring will straighten by a known amount. This causes the attached pointer to move over a printed pressure scale. As the oxygen is discharged, the pressure decreases and the coiled spring will return toward its initial shape causing the pointer to move and indicate the decreased pressure remaining.

A problem with these systems is that they are, in the first instance, very crude at determining exactly how much oxygen is left in the tank. Generally, the analog dial and pointer will simply have three areas, a first area (often shown in green) where it is known that the tank has plenty of oxygen for a majority of intended uses or is essentially full, a second area (often shown in white) where the tank has had some use and may not be useable in all circumstances, but still has sufficient oxygen that it really doesn't make sense to send it for refill yet, and a third area (often shown in red) where the tank has sufficiently discharged that, while it may be useful in some limited circumstances, it likely needs to simply be sent back for a refill and should not be further used due to concerns that it could run out of oxygen mid-use. While this type of indicator can be effective to show general status, a problem with these systems is that there is no way to know if the tank is suitable for the particular intended use. Because the tanks are used with a variety of patients, purposes, and flow rates, a tank which is sufficiently full for one patient, may be low for a second one, even though the tank has the same amount of pressure.

This leads into another problem with the prior gauges. Because the volume is indicated in pressure, it can be very difficult for a user to convert that to serviceable time, or to an actual amount of useable gas. The conversion is often not mathematically straightforward. This calculation difficulty is also compounded by the fact that the display may lack sufficient granularity to know the precise pressure. Because of this, tanks are not always used efficiently and there can be the danger of trying to use a tank that should not be used simply because the user doesn't realize the tank isn't full enough for the intended use.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a system for determining the available duration of a gas in a gas cylinder comprising: a gas cylinder containing a gas; a gas outlet connector; a regulator in fluid communication with the gas cylinder and the gas outlet connector, the regulator controlling the rate at which the gas flows from the gas cylinder to the gas outlet connector; a selector knob for selecting a flow rate from a plurality of flow rates; a spring plunger connected to the selector knob and having a position corresponding to the selected flow rate; a potentiometer detecting a location of the spring plunger; and a processor configured to receive from the potentiometer a signal indicating the location of the spring plunger, detecting the selected flow rate, and causing the detected flow rate to be displayed on a display.

In an embodiment of the system, the gas cylinder is a high-pressure medical cylinder.

In an embodiment of the system, the system further comprises a pressure sensor detecting the pressure of the gas in the gas cylinder.

In an embodiment of the system, the system is further configured to receive the detected gas pressure from the pressure sensor and cause the received gas pressure to be displayed on the display.

In an embodiment of the system, the processor is further configured to: calculate an estimated duration of the remaining supply of the gas in the gas cylinder based at least in part on the detected gas pressure and the selected flow rate; and cause the calculated estimated duration to be displayed on the display.

In an embodiment of the system, the calculated estimated duration is further based at least in part on the volume of the gas cylinder.

In an embodiment of the system, the calculated estimated duration is further based at least in part on the type of gas in the gas cylinder.

Also described herein, among other things, is a system for determining the available duration of gas in a cylinder comprising: a gas cylinder; a gauge system removeably attached to the gas cylinder, comprising: a regulator body enclosing an internal space; a gas outlet connector in a wall of the regulator body and adapted for connecting an external hose to the gas outlet connector, the gas outlet connector in communication with the gas cylinder via the internal space; a gas flow selection subsystem disposed within the body and adapted to allow gas flow from the gas cylinder to the gas outlet connector at a selected gas flow rate; a rotary membrane potentiometer disposed within the regulator body and having a conductive annular surface having a linearly varying resistance around its circumference, the linear varying resistance including a resistance range corresponding to the selected gas flow rate; a spring plunger disposed within the regulator body in electrically conductive contact with the conductive annular surface at a selected position, the linear varying resistance at the selected position being within the resistance range; and a selector knob rotatably disposed on the exterior of the regulatory body and user-adjustable to a plurality of flow rate positions, the selector knob being mechanically connected to the gas flow selection subsystem such that when selector knob is in a selected flow rate position in the plurality of flow rate positions: the gas flow selection subsystem allows gas flow from the gas cylinder to the gas outlet connector at the selected gas flow rate; and the spring plunger contacts the annular surface at the selected position; a controller disposed in the regulator body and in electrical communication with the potentiometer, the controller comprising a processor configured to execute the steps of: receive from the rotary membrane potentiometer an electrical signal having an electrical resistance in the resistance range; convert the received electronic signal to the flow rate, the conversion being based upon the electrical resistance of the received electronic signal being in the resistance range; and cause to be displayed on a display an indication of the flow rate.

In an embodiment of the system, the gas cylinder is a high-pressure medical cylinder.

In an embodiment of the system, the gas flow selection subsystem comprises a regulator.

In an embodiment of the system, the gas flow selection subsystem further comprises a plate rotatably disposed at least partially in a channel between the gas cylinder and the gas outlet connector, the plate having an orifice configured to allow gas flow through the orifice at the selected gas flow rate; the mechanical connection of the selector knob to the gas flow selection subsystem being operable to cause the orifice to be disposed in the channel when the knob is in the selected flow rate position such that gas flowing from the gas cylinder to the gas connector passes through the orifice at the selected gas flow rate.

In an embodiment of the system, the system further comprises a pressure sensor disposed in the regulator body and in electrical communication with the controller.

In an embodiment of the system, the controller processor is further configured to execute the steps of: receiving from the pressure sensor a second electrical signal indicative of the gas pressure in the gas cylinder; and causing to be displayed on the display an indication of the gas pressure indicated by the received second electrical signal.

In an embodiment of the system, the controller processor is further configured to execute the steps of: calculate, based at least in part on the indicated gas pressure and at least in part on the converted flow rate, an estimated duration of the gas supply in the gas cylinder; and cause to be displayed on the display the calculated duration of the gas supply.

In an embodiment of the system, the calculated estimated duration is further based at least in part on the volume of the gas cylinder.

In an embodiment of the system, the calculated estimated duration is further based at least in part on the type of gas in the gas cylinder.

In an embodiment of the system, the calculated estimated duration is calculated at least in part using the mass of gas remaining in the gas cylinder, the mass being determined at least in part by determining the number of moles of the gas remaining in the gas cylinder using the combined ideal gas law, $pV=nRT$, wherein: p is the indicated pressure; V is the volume of gas cylinder; n is the number of moles of gas in the gas cylinder; R is the universal gas constant; and T is temperature.

In an embodiment of the system, the temperature is an assumed constant temperature.

In an embodiment of the system, the system further comprises a temperature sensor disposed in the regulator body and in electrical communication with the controller; the controller processor is further configured to execute the step of receiving from the temperature sensor a third electrical signal indicative of the temperature in the gas cylinder; and the temperature is the indicated temperature.

In an embodiment of the system, the processor is further configured to execute the steps of: initiating a first audible alarm if the calculated duration of the gas supply is below a first preset duration; and initiating a second audible alarm if the calculated duration of the gas supply is below a second preset duration.

In an embodiment, the system further comprises a second gas outlet connector in the wall of the regulator body, the second gas outlet connector also adapted for connecting an external hose to the gas outlet connector and the gas outlet connector also in communication with the gas cylinder via the internal space; wherein, the gas flow selection subsystem is adapted to allow gas flow from the gas cylinder to the second gas outlet connector at a higher selected gas flow rate.

Also described herein, among other things, is a method for determining the available duration of a gas in a gas cylinder comprising: providing a system comprising: a gas cylinder containing an amount of a gas; a gas outlet connector in fluid communication with the gas cylinder via a variable gas flow rate regulator settable to a plurality of gas flow rates; a variable resistance potentiometer; a pressure sensor; a processor; and a display; determining the gas pressure of the amount of gas in the gas cylinder using the pressure sensor; setting the variable gas flow rate regulator to a selected gas flow rate in the plurality of gas flow rates; detecting the selected gas flow rate with the variable resistance potentiometer; receiving at the controller: an indication of the selected gas flow rate detected in the detecting step; and an indication of the gas pressure determined at the determining step; calculating, using the processor, an estimated duration of the amount of gas in the gas cylinder, based least in part, on the indication of the selected gas flow rate and the indication of sensed gas pressure received in the receiving step; and displaying the calculated estimated duration of the amount of gas on the display.

In an embodiment, the method further comprises recording said calculated estimated duration of said amount of gas and said selected gas flow rate, associating said recording with a time at which said recording was made, and repeating said recording and associating at a plurality of different times.

In an embodiment, the method further comprises retrieving said plurality of recordings at a later time and utilizing said retrieved plurality of recordings to predict a lifespan of said gas cylinder.

In an embodiment, the method occurs in real-time.

BRIEF DESCRIPTION OF THE DRAWINGS

FIG. 1A provides a view of the right side, FIG. 1B provide a view of the front, FIG. 1C provides a view of the left side, FIG. 1D provides a cut through view from the left side, and FIG. 1E provides a cut through view from the back side.

DESCRIPTION OF THE PREFERRED EMBODIMENT(S)

There is described herein, among other things, a pressure gauge system for a tank with a variable flow rate that provides a user with an indication of how much usable time is left in a pressurized gas tank given a particular selected flow rate or operational condition and what pressure of gas is left in the tank. This time display may be provided in real time or near real time and the pressure gauge system can also provide additional information to a user, such as asset tracking information, historical usage information, and future predictive information. This additional information can also be provided in real time or near real time.

Throughout this disclosure, the term "real time" refers to software and/or hardware operating within operational deadlines for a given event to commence or complete, or for a given module, software, or system to respond, and generally invokes that the response or performance time is, in ordinary user perception and considered the technological context, effectively generally cotemporaneous with a reference event. Those of ordinary skill in the art understand that "real time" does not literally mean the system processes input and/or responds instantaneously, but rather that the system processes and/or responds rapidly enough that the processing or response time is within the general human perception of the passage of real time in the operational context of the program. Those of ordinary skill in the art understand that, where the operational context is updating a graphical user interface, "real time" normally implies a response time of no more than one second of actual time, with milliseconds or microseconds being preferable. However, those of ordinary skill in the art also understand that, under other operational contexts, a system operating in "real time" may exhibit delays longer than one second, particularly where network operations are involved.

Figure 1A:
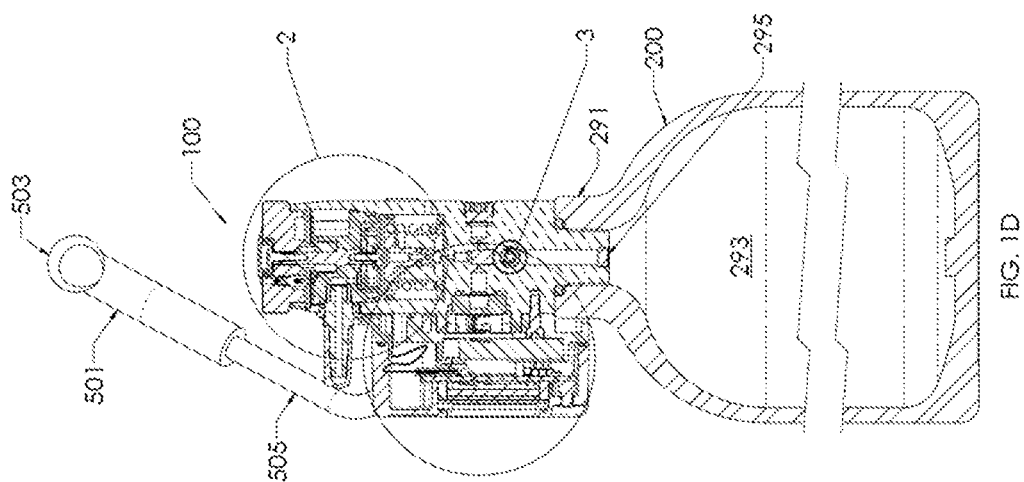
FIGS. 1A-1E provide various views of an embodiment of a gauge system in place on top of a tank.
Figure 1B:
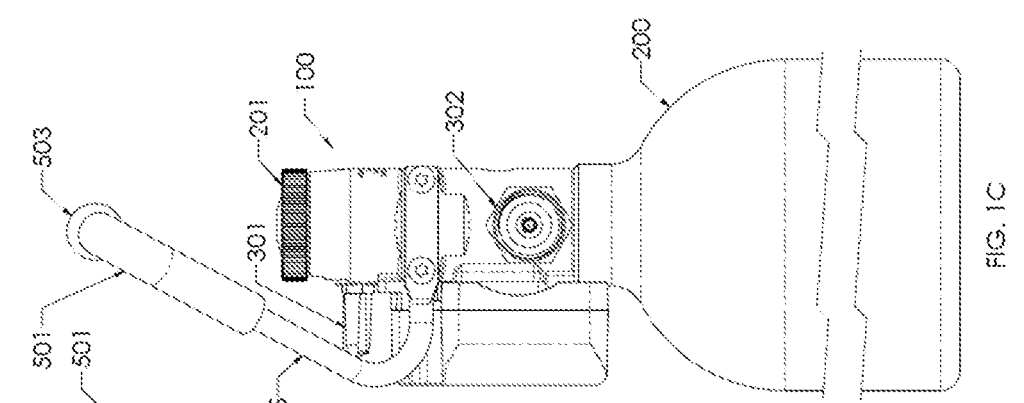
Figure 1C:
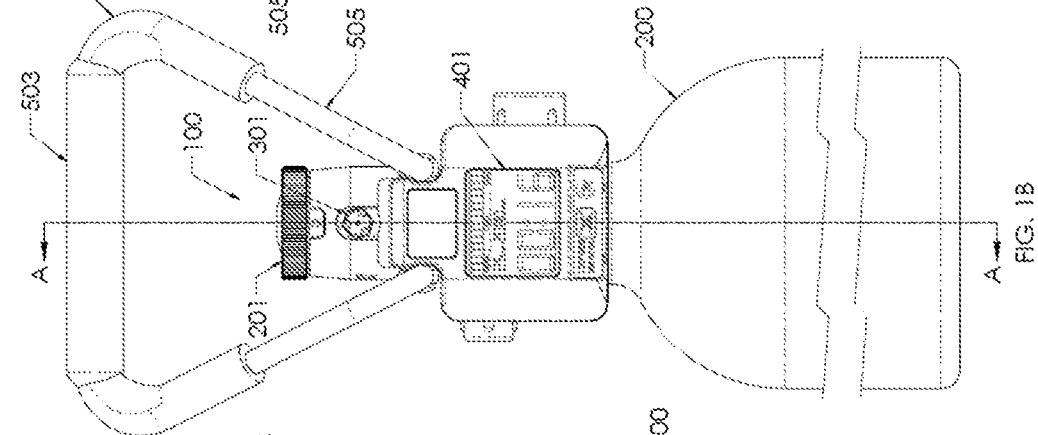
Figure 1D:
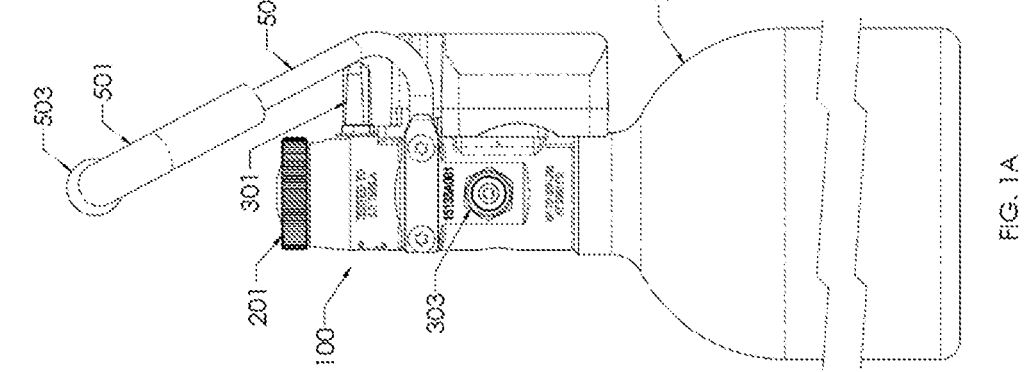
Figure 1E:
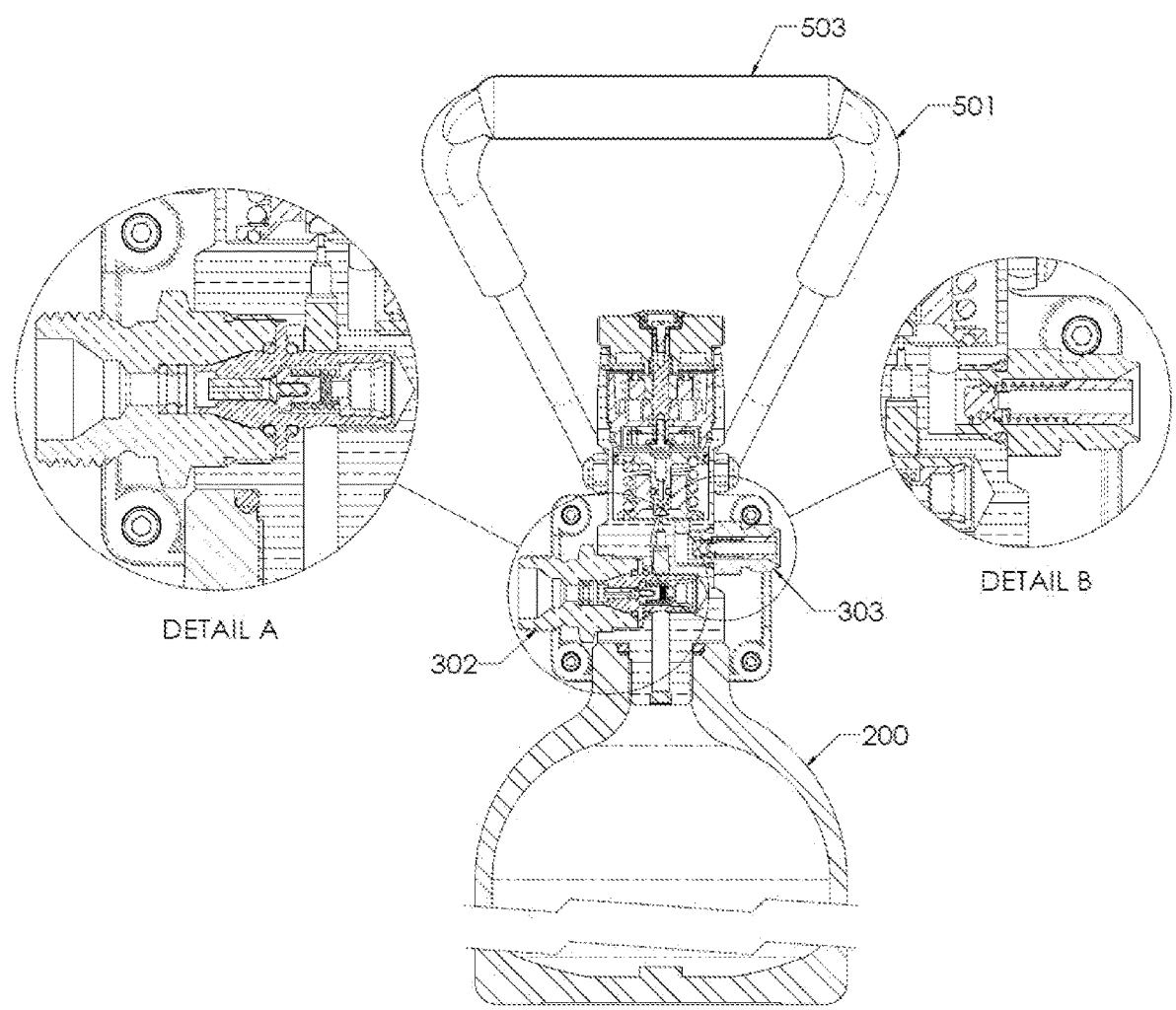
Figure 2:
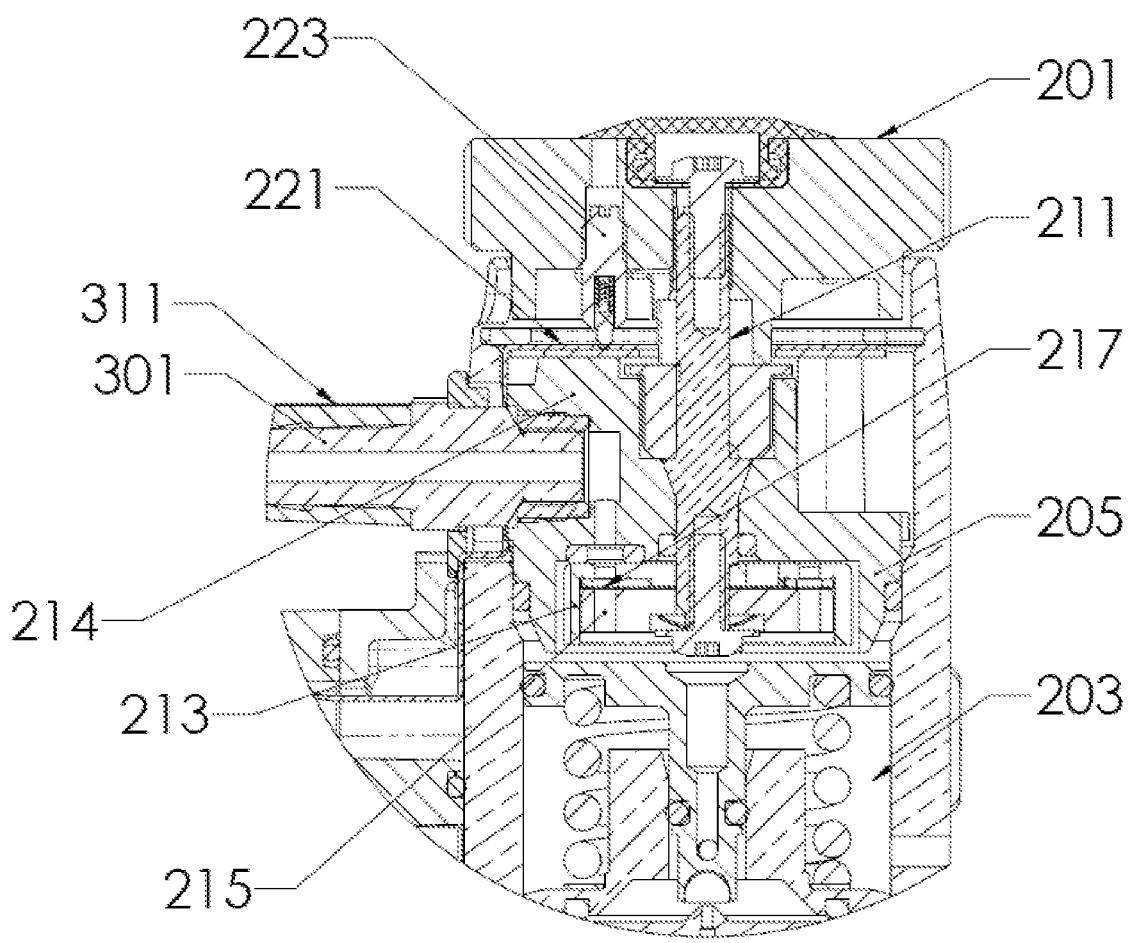
FIG. 2 provides a detail view of the major elements of the regulator and flow selector subsystem of the system of FIG. 1D as indicated by reference "2" in FIG. 1D.
Figure 3:
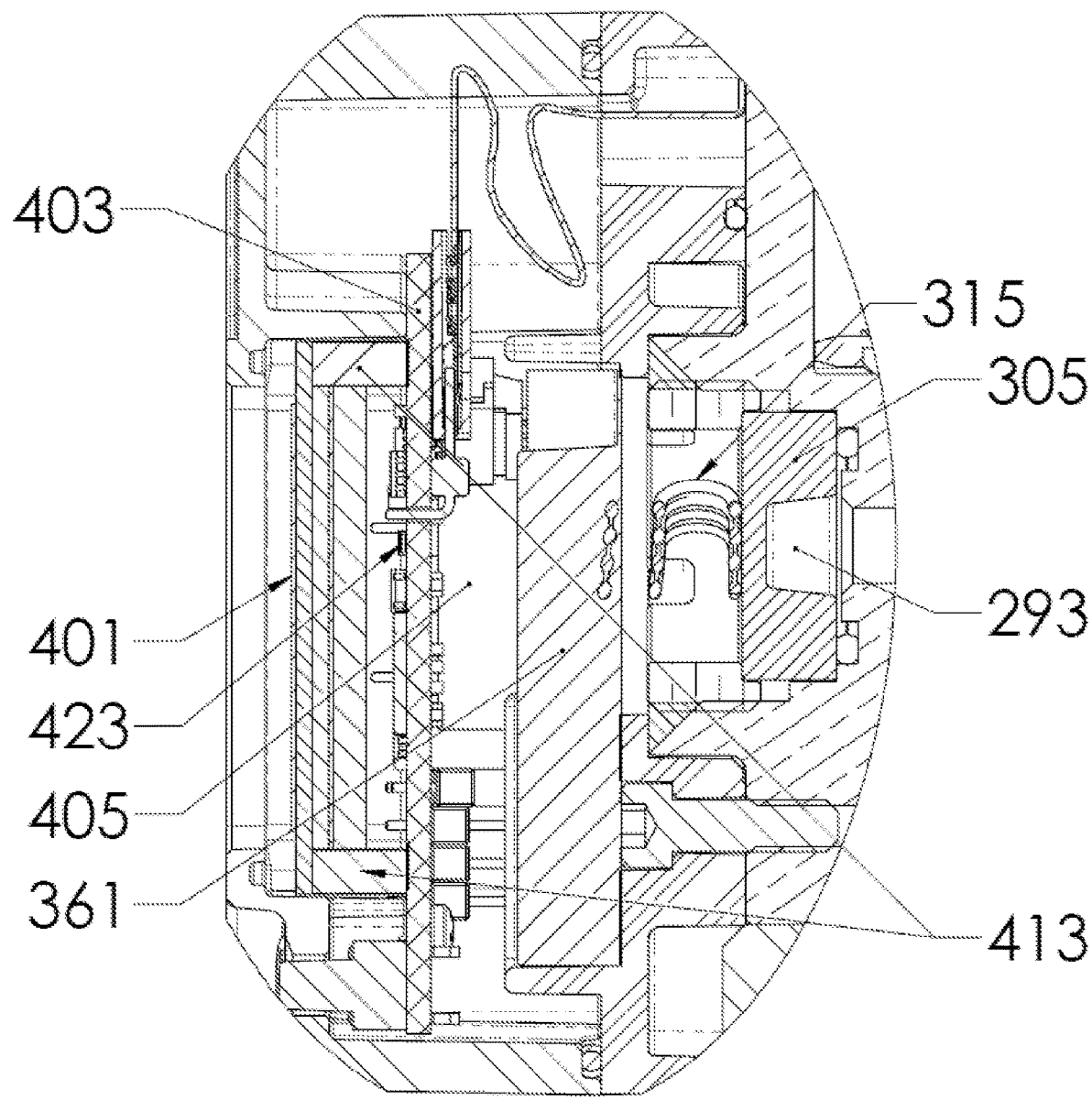
FIG. 3 provides a detail view of the major elements of the pressure sensing subsystem and display subsystem of the system of FIG. 1D as indicated by reference "3" in FIG. 1D.

FIGS. 1A through 1E provide for a first embodiment of a regulator system (100). The system (100) will generally determine the available duration of a particular gas cylinder in a particular application by determining what the pressure is in an attached storage gas cylinder (200) and then determining the selected output flow chosen by the user. From these two variables, the amount of available time of gas remaining in the tank (200) at that particular flow rate can be calculated. The flow is generally determined via a selector knob (201) with an attached position detector subsystem (2), the primary elements of which are generally shown in FIG. 2. The pressure is generally determined by a pressure sensor subsystem (3), the primary elements of which are shown in FIG. 3. The sensor outputs of the subsystems (2) and (3) are generally provided to a control and display subsystem (4), which is also shown in FIG. 3.

In order to provide for certain safety checks and information transfer, the system (100) will typically provide a visual display of the available time, flow (discharge) rate, and cylinder pressure, but this is not strictly necessary and alternative embodiments may provide any combination of these. The system (100) also may provide for audible and/or visual alerts to provide warning signals when the tank (200) reaches a certain preset level of pressure, the tank (200) reaches a certain preset duration of remaining gas, and/or the battery (361) level of the system (100) reaches a certain preset level(s) where it needs to be replaced to avoid concern of the system (100) turning off inadvertently due to lack of power.

FIGS. 1A through 1E provide for various depictions of an embodiment of the regulator system (100) attached to a tank (200). The regulator (100) is attached onto the pressurized gas tank (commonly a high-pressure medical cylinder) (200) in a standard fashion known to those of ordinary skill in the art. Generally, this will be via a screw type connection, permanent connection, or another connection which inhibits inadvertent separation of the regulator (100) from the tank (200). When connected, the display (401) will generally be accessible to the user from which they can view details of the tank (200), a selector knob (201) for selecting their flow rate and one or two gas output connectors (303) and (301). One of these connectors (303) is primarily for use in connecting the tank to a medical apparatus that can handle a relatively large flow of gas such as those that may have internal controls for gas flow. This connector will generally be a specialized connector designed to fit tubing attachments specific to those devices. The other is a lower pressure connection (301) which is typically connected to a piece of rubber, silicone, plastic or other tubing where the gas is supplied more directly to a patient.

As can be best seen in FIGS. 1A through 1E, the system (100) may also provide additional convenience features not directly associated with gas flow. In the FIGS. there is visible a carrying handle (501). This handle (501) is generally curved and is positioned so that the grip (503) is positioned directly over the neck (291) of the tank (200) and over the center of gravity of the tank (200) system. This allows the tank (200) to be carried upright as well as providing for good balance during hand transport. The grip (503) will generally be connected to the rest of the system (100) via at least one support (505).

FIG. 2 provides additional detail as to the flow regulation subsystem (2) of the system (100). Specifically, the open neck (291) of the tank (200) will generally connect to a pressure regulator (203) of design known to those of ordinary skill in the art and suitable for the specific type of cylinder (200). Gas (293) which is stored in the cylinder (200), enters the high-pressure side (295) of the regulator and is regulated by the regulator (203) down to a lower, more manageable pressure and delivered to the intermediate outlet passage (215) of a flow selector (205). If the selected flow is zero (the system (100) is closed and the tank (200) is not in use), this is generally the end of the pathway for the gas (293) and the system (100) is considered to not be in use but to be in a "standby mode" awaiting use.

In order to provide for gas (293) flow from the tank (200), a user will turn the manual selector knob (201) at the top of the system (100), this will result in the knob (201) rotating a shaft (211) which is in turn connected, directly or indirectly, to a plate (213). The plate (213) will comprise a plurality of orifices (217) which are interchangeably positioned in alignment or out of alignment with the low pressure output of the regulator which is at intermediate outlet passage (215). To meter the gas (293) flow down to a desired flow, the user would turn the manual selector knob (201) until the desired flow rate was selected. This may be indicated by markings on the knob (201) itself or may be through viewing the flow rate on the display (401) as discussed later. As the knob (201) is turned, the various orifices (217) are lined up and pulled out of alignment with an intermediate outlet passage (215) generally in an expected manner (e.g. they get bigger the more the knob (201) is turned). Thus, as the knob (201) is turned the specific amount to correspond to a flow, the orifice (217) which provides the flow selected is positioned in line with the intermediate outlet passage (215). The selection generally occurs via direct mechanical translation of the motion of the knob (201) to the shaft (211) relative to the body (214) and plate (213).

It should be recognized that the method of selecting flow can be discrete, such as where the plate (213) includes distinct orifices (217) interspersed with multiple sections of solid material, or can be continuous, such as where various orifices (217) are interconnected (effectively being a single orifice) but the size of orifice (217) in alignment with the intermediate outlet passage (215) changes size along a continuous spectrum as the knob (201) is turned. To correspond to this, the selector knob (201) can be designed so as to have discrete "turned-to" locations, such as, for example, being in a stepping pattern where spaces between the orifices (217) generally cannot be selected, or can allow for free movement through all positions.

Once an orifice (217) is aligned with the intermediate outlet passage (215) from the low pressure output of the regulator, the regulated, metered gas (293) is routed out through the selected orifice (217) and into a gas outlet connector (301). In the preferred embodiment, there will generally be two connectors. A first connector (301) will be the one intended to be primarily used and will comprise a barbed fitting over which a rubber, silicone, or plastic hose (311) can be readily attached and held in place by friction or other methods. These types of fittings are well understood by those of ordinary skill in the art. The gas (293) will then flow through the hose (311) to an end use.

In the depicted embodiment, the system (100) also includes a second outlet (303). This outlet (303) can provide a particularly large gas flow designed for different uses and therefore will comprise a different style of connector (303). Gas flow to this connector (303) may correspond to a specific position of the knob (201) or may correspond to a control given via a different method. For example, this connector (303) may be designed and positioned such that when a hose with a mating connector is connected to it, the gas (293) flow from the regulator is allowed to bypass the intermediate outlet passage (215) and plate (213) to go to a separate path via a different inlet.

Inclusion of this alternative connector (303) allows for the tank (200) to be used in certain high flow-rate applications. Such a connector (303) can be particularly useful when the tank (200) is connected to certain machines such as, but not limited to, a ventilator or incubator.

Further, the inclusion of connectors (302) and (303) can provide for purging the tank prior to refill, so that the tank is quickly discharged. The connector (302) can be used to refill the tank (200) when it is empty.

In order to determine the flow rate of the tank at any given time, it is preferable that a continuous analog sensor be provided which in the depicted embodiment of FIG. 2 is a rotary membrane potentiometer (221) provided under the manual selector knob (201). Generally, the plate of the rotary membrane potentiometer (221) has an annular area of linearly varying resistance around its circumference. A circuit is closed with the potentiometer (221) once a spring plunger (223), housed in the flow selector knob (201), applies a set range of force on the annular region in a particular location. In the event of discrete flow positions, the flow positions correspond to separate resistance ranges of the annular region which in turn correspond to the various orifices (217) in the plate (213). For example, when the knob (201) is turned to a third position, the plate (213) is moved to an orifice (217) corresponding to the flow rate corresponding to the third position, and the spring plunger (223) is moved to a position on the rotary membrane potentiometer (221) where the resistance corresponds to the third position. Movement of a continuously variable orifice (217) and knob (201) is similar, but the potentiometer (221) will generally have a continuously variable region of resistance, as opposed to discrete positions. In either case, the signal from the potentiometer (221) at any given position is indicative of the position of the knob (201) and plate (213).

This signal is then routed from the membrane potentiometer (221), into the display subsystem (4) where it connects to a controller (403) as shown in FIG. 3. The controller (403) is generally a small specifically built computer or similar device constructed on a printed circuit board (PCB) and having a general purpose (micro)processor (423) with associated software stored in memory capable of performing necessary calculations and output appropriate signals. Alternatively, the controller (403) may be implemented without a general purpose (micro)processor (423) using appropriate dedicated electrical circuitry. Regardless of implementation, the controller (403) converts the electronic signal from the rotary membrane potentiometer (221) to one of a plurality of different settings. Specifically, it will convert the signal into the flow setting corresponding to the selected knob (201) position and orifice (217). In an embodiment, this conversion may occur in real-time. It may also provide that there is a signal which would generally be indicative that the flow is stopped. This would be the case where the knob (201) is in the off position and the plate (213) is positioned so that there is no orifice (217) aligned with the intermediate outlet passage (215) blocking the intermediate outlet passage (215).

The term "real time" as used herein refers to operation within operational deadlines for a given event to commence or complete, or for a given module, software, or system to respond, and generally invokes that the response or performance time is, in ordinary user perception and considered the technological context, effectively generally contemporaneous with a reference event. Those of ordinary skill in the art understand that "real time" does not literally mean the system processes input and/or responds instantaneously, but rather that the system processes and/or responds rapidly enough that the processing or response time is within the general human perception of it being instantaneous compared to the passage of time in the operational context of the program. Those of ordinary skill in the art understand that, where the operational context is a graphical user interface, "real time" normally implies a response time of no more than one second of actual time, with milliseconds or microseconds being preferable. However, those of ordinary skill in the art also understand that, under other operational contexts, a system operating in "real time" may exhibit delays longer than one second, particularly where network operations are involved.

The converted signal from the controller (403) is then sent through wiring, such as elastomeric strips (413) to a display (401). In the present embodiment, this is an LCD display but other displays may be used as would be understood by one of ordinary skill in the art. The display (401) receives the signal and appropriate energizing of the display (401) occurs to display the flow setting selected by the user. The display (401) and controller (403) may also be provided with a suitable power source such as, but not limited to, a battery (361).

The controller (403) may also provide additional functionality to the above to provide the system with additional features. For example, the controller (403) may include a transceiver or other network communication array which can communicate with an external communications system or network. This can allow the controller (403) to communicate information such as, but not limited to, usage patterns of tanks (200) including how they are being handled by both those discharging them and those refilling them. The communication can alternatively or additionally related to a tank (200) location to provide for asset location or similar services. Still further, communication can be to provide communications with existing infrastructure systems including security systems, assets control systems, and other systems which are interested in the location, use, or current, prior, or expected future characteristics of tank (200).

A "transceiver" refers to equipment, or a set of equipment, having the hardware, circuitry, and/or software to generate and transmit electromagnetic waves carrying messages, signals, data, or other information. A transceiver may also comprise the componentry to receive electric signals containing such messages, signals, data, or other information, and convert them to such electromagnetic waves. A transceiver also refers to equipment, or a set of equipment, having the hardware, circuitry, and/or software to receive such transmitted electromagnetic waves and convert them into signals, usually electrical, from which the message, signal, data, or other information may be extracted.

Throughout this disclosure, the term "network" or "communications system" refers to a generally wireless network used in the systems and methods of the present disclosure. A network may use general networking protocols and standards and may be, but is not necessarily, a special-purpose network. That is, while the nodes in the network could be deployed for the specific purpose of setting up a network specifically for the present systems, they need not be and generally will not be. Ordinary wireless networks established for other purposes may be used to implement the systems and methods described herein.

As best shown in FIGS. 2 and 3, the high-pressure side (293) of the regulator (203) will generally comprise a ceramic pressure sensor (305), or other pressure sensor, that converts the varying gas (293) pressure into various resistances. In an embodiment, this is by means of a Wheatstone bridge type circuit although other systems, circuits, and software implementations may be used in other embodiments. Specifically, in the depicted embodiment, the Wheatstone bridge circuit is provided in a location so that high pressure gas (293) in the tank is in contact (directly or indirectly) with one side of the circuit. Assuming that the pressure of the gas (293) on this side is greater than a preselected pressure on the opposing side (which may be ambient or may be a particular preselected value that provides for particular granularity in readings or values), the Wheatstone bridge circuit is deformed. The amount of deformation is translated by the circuit into an electrical signal and this signal is routed through a cable (315) to the controller (403) where it is converted to the appropriate pressure units by the (micro)processor (423) or dedicated circuitry. This allows the user (or any other interested person) to know the actual pressure of the tank (200). Similarly to the flow rate, signals indicative of the pressure are sent via connections (413) to the display (401) and appropriate display segments are energized to display the pressure in the tank (200).

In addition to providing an indication of the flow rate and remaining pressure, the system (100) can utilize these pieces of information to calculate an expected duration of gas (293) left in the cylinder (200). Specifically, with knowledge of the amount of gas (293) in the cylinder (200) and the rate at which it is currently leaving, the amount of time can be determined before the tank (200) reaches a predetermined value at which the tank must be refilled. Generally, this is an indication that the tank (200) is effectively empty.

The expected duration of gas (293) in the cylinder (200) may be calculated using any number of techniques. In one embodiment, the gas pressure can be compared to the flow rate based on an assumed linear relationship between the change in gas pressure and the flow rate, and an estimate of the remaining amount of gas (in terms of amount of time at the current flow rate) can be calculated. This is because the gas is typically highly pressurized, and the mass of available gas, compared to the relatively low flow rate, results in an effectively linear or other known or predictable behavior of the pressure as the relatively small amounts of gas are released. This rate, once known or determined, can be used to estimate the amount of time remaining at the current flow rate until the pressure is low enough that the tank is considered "empty" for medical purposes, even though, in a physical sense, an amount of gas remains.

Alternatively, the actual mass of gas in the tank (as opposed to the volume of the gas) may be estimated using well-known chemical formulae. By way of example and not limitation, the combined ideal gas law may be used to estimate the number of moles of gas remaining, which in turn can be used to estimate the mass. One of ordinary skill will understand the combined ideal gas law to be $pV=nRT$, wherein:

p is pressure of the gas in the gas cylinder;
V is the volume of the gas cylinder;
n is the number of moles of gas in the gas cylinder;
R is the universal gas constant; and
T is the temperature of the gas.

In some embodiments, temperature T is detected using a thermometer included in the system. However, in embodiments having a gas at high pressures, T changes little and can be treated as a constant for purposes of calculating mass to estimate the expected duration. This also simplifies the cost and complexity of the system by eliminating the thermometer. In an embodiment using the combined ideal gas law, the volume of the gas cylinder is known, and the identity and molar mass of the gas compound is known. These factors, when combined with the detected pressure, allow the mass of the remaining gas to be calculated. The mass, when combined with the flow rate, allows for an estimate of the amount of time remaining. By way of example and not limitation, because the flow rate of gas is known, the mass of gas flowing out of the tank can be estimated and compared with the mass remaining to estimate the duration.

In conducting these calculations, one of ordinary skill will understand that the regulator can effectively render the flow rate constant, provided the gas cylinder contains enough gas at high enough pressure to maintain the flow rate. The pressure point at which the tank is considered "empty" is thus set at a pressure higher than the point at which the regulator can no longer maintain the constant flow rate. Thus, from the point of view of the flow rate, the flow rate is constant for a given setting, then dropping immediately to zero once the cylinder pressure reaches the "empty" threshold.

It should be recognized that the tank (200) need not be truly empty (have no gas (293)) at the time the tank (200) is indicated as being "empty" and needing to be refilled. Because there will always be the potential for error in both readings of the rate and remaining pressure, it will commonly be the case that the system (100) will indicate that the tank (200) is "empty" when there is still some amount of gas remaining. Like the flow rate and remaining pressure, the duration of gas remaining in the tank will generally also be displayed on the display (401) after being calculated by the (micro)processor (423) or appropriate circuitry.

The reasons for providing a user with an "empty" indication when the tank is not really empty are generally two-fold. In the first instance, such an indication means that a user will generally not utilize a tank (200) with very little gas remaining in it, even if the user does not require very much gas as the tank is indicated to be "empty". A second reason to provide such an indication is so that if the user is currently using a tank (200) at the time it reaches the point where it needs to be refilled ("empty"), the gas flow does not immediately stop as it would if the tank (200) were actually empty. This allows a user with a tank (200) that is now in an alarm situation sufficient time to locate a replacement tank and prepare it to replace the current tank (200) before the oxygen flow from the tank (200) ceases or is reduced to an undesirably low level.

In order to provide additional functionality, the controller (403) will often incorporate a variety of additional components. This can include, but is not limited to, a buzzer or similar audible signal generator (405) that can be operated when certain alarm conditions are met (e.g. such as when the tank (200) is considered empty). These signals can also change depending on how empty the tank is to provide a form of escalating alarm. The controller may also include a jumper or similar connection that can be set to indicate the size of the cylinder (200) being used to the controller (403) so that the system (100) can be installed on a variety of different tanks (200). Still further, the controller (403) may include an access port, such as, but not limited to a serial port, for flashing firmware updates, calibration of the pressure sensors, and/or downloading of usage data of the system (100) either as an alternative or additional methodology to a transceiver communicating wirelessly with a network.

The controller (403) may also include functionality to allow for usage over time data. Specifically, the controller (403) may be able to record the flow rate and/or available gas in the tank (200) at any given time. As multiple readings are taken, the controller (403) can evaluate the recorded values for patterns. For example, the controller (403) may know that the tank (200) has historically been used at the same flow rate every morning at the same time for 6 days in a row. Based on this pattern, the controller (403) may predict that the tank (200) will be used the following morning at the same time, but that if that is the case the tank (200) will not have enough gas to provide the same rate at the same time on day eight. This could be used to trigger an alarm situation to a user either now, or after the seventh use. The information may also be sent via a network to a central monitoring agency. They can use this information to better predict when specific tanks (200) will need to be filled, or the information may be aggregated with information from other tanks (200) so that they can better provide refilling services to the organization using the tanks (200).

In addition to the above, which will generally be for use only by technicians and not by a standard user, the user may also be provided with one or more user operable switches, buttons, touchscreens or similar manipulable objects to allow them to do such things as cycle the display (401) between different display modes, to cycle the system (100) between certain different operational modes as required, or to silence alarms that are no longer of interest.

The system is generally expected to operate in a number of different modes. The first of these is the "Standby Mode" where all outlets (301) and (303) are in the OFF position and no gas (293) is flowing beyond the intermediate outlet passage (215) or through any other mode to connectors (303) or (301). In this arrangement, the tank (200) is ready and waiting to be used. There is no indication of an expected use lifetime as there is no flow rate. Instead, the tank (200) is simply sitting ready. It would be assumed that when in standby mode that the tank (200) has sufficient gas (293) to be useable with another patient, so the display (401) will commonly just show the pressure in digital and graphical form.

Figure 4:
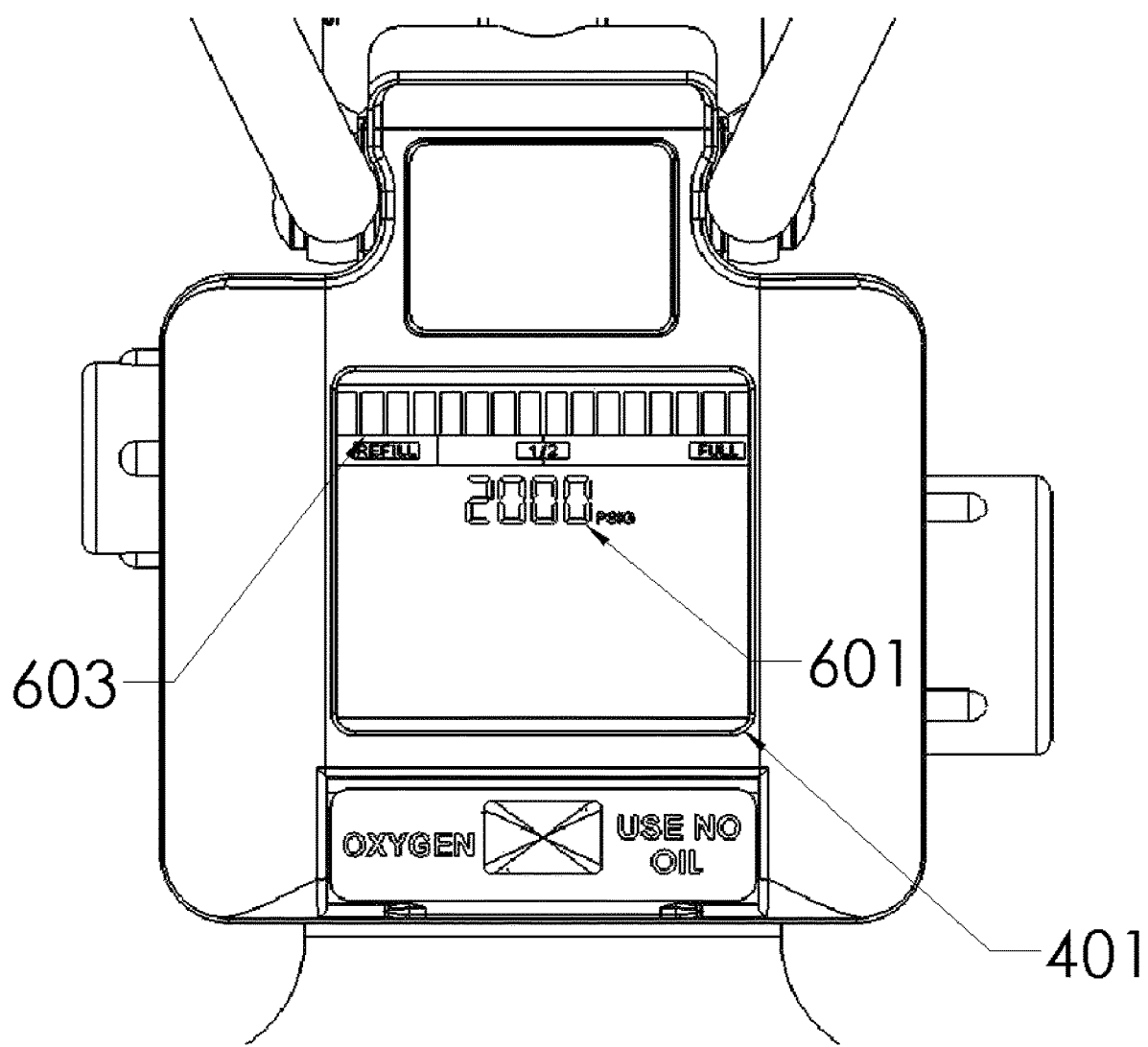
FIG. 4 provides an embodiment of a screen display of a full tank in standby mode.

An embodiment of this is shown in FIG. 4 where an indication of the actual gas pressure (601) is provided along with a visual display which may utilize the more traditional green, yellow, and red regions as is used on an analog gauge or some other form of bar indicator (603). The latter can provide a user who is unfamiliar with the tank's (200) operation a simple indication of how full the tank (200) is. In FIG. 4, the tank (200) is completely full so the visual display (603) shows bars all the way in the green and the gas flow pressure (601) is 2000 psig.

Figure 5:
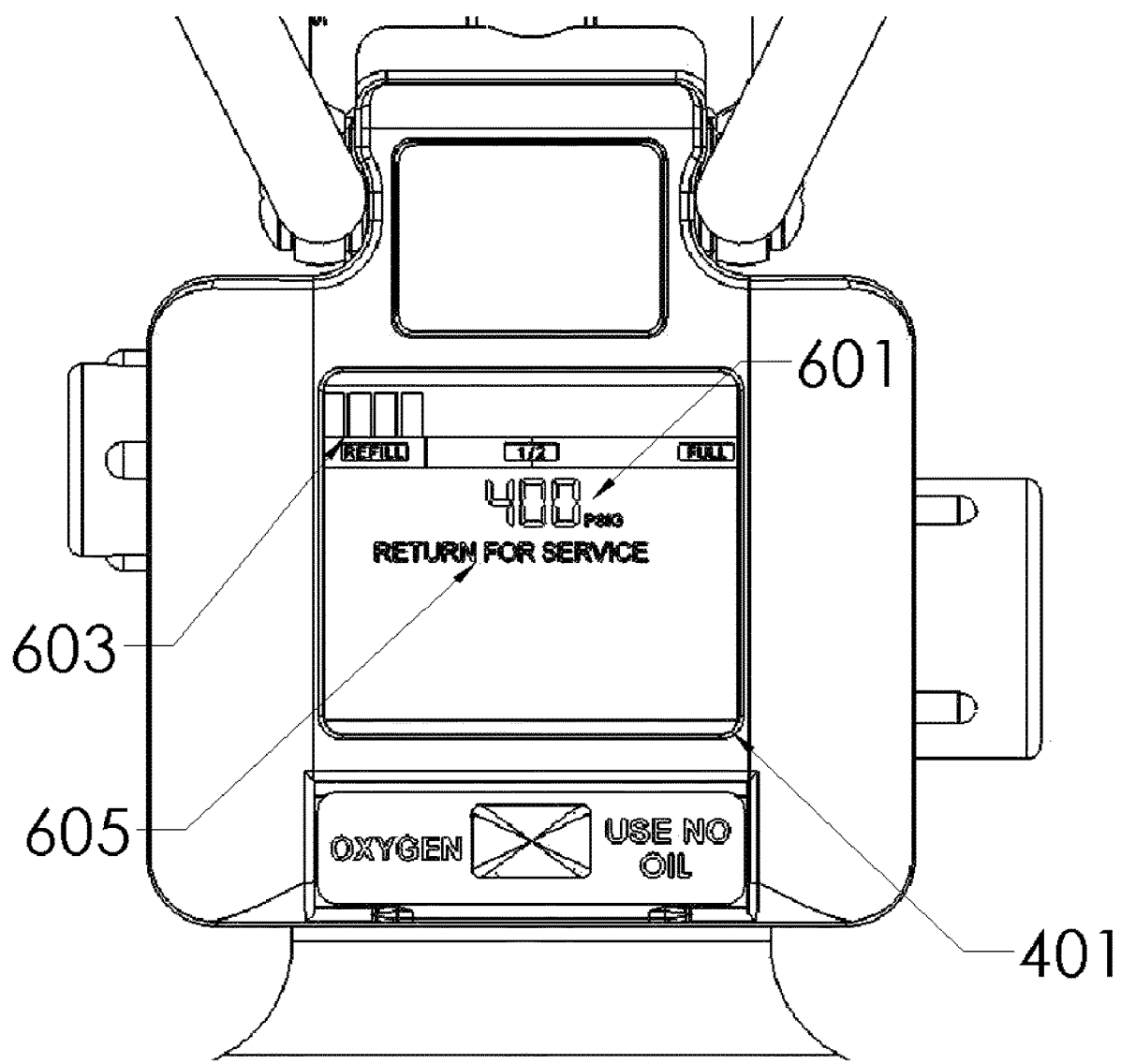
FIG. 5 provides an embodiment of a screen display of a tank considered "empty" (with a fill below a predetermined threshold) in standby mode and without audible alarm.

The system (100) also generally provides at least one "Alarm Mode". An alarm occurs anytime the pressure reaches a certain preset level, reaches a certain preset duration of remaining gas flow, and/or when the battery (361) level(s) drop to a level where it needs replaced. FIG. 5 provides an example of a first alarm mode which corresponds to a standby mode with insufficient gas available. In this mode, the display (401) is again providing the gas pressure (601) in the tank (200), i.e., 400 psig. However, as can be seen, the pressure is less than a quarter of what it was in FIG. 4. Similarly, the visual display (603) now shows a bar in the "refill" section. The display also shows a targeted visual indicator (605) specifically indicating that the tank should not be used and needs to be refilled. The system (100), however, is otherwise passive in its display. This is because this tank is not in use, and therefore is in a stable mode, even though it needs to be refilled.

Figure 6:
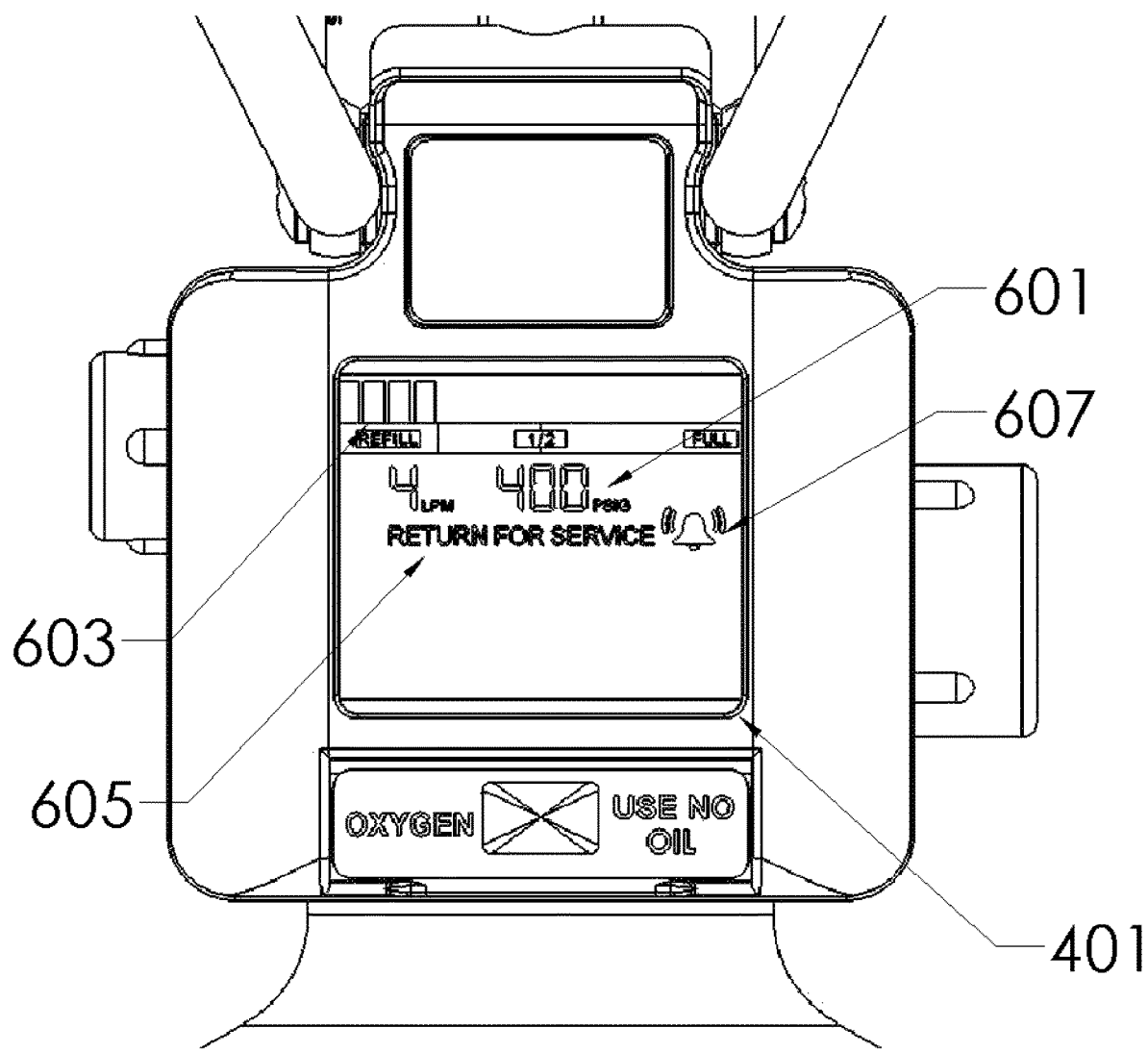
FIG. 6 provides an embodiment of a screen display of an empty tank in an audible alarm mode.

FIG. 6 is an example of a display for a more active alarm mode. In this mode, an audible alarm sounds when the pressure and/or duration level reaches a preset level. This may occur if the pressure is sufficiently low, and may only occur when gas is being provided to a patient directly or indirectly as described in "therapy mode" operation as discussed below. It may also or alternatively be used if the flow rate from the tank (200) is sufficiently high that a rapid discharge of the tank is detected regardless of the current fill amount. The latter will often be preferred as it keeps the system (100) from making noise which could be disturbing unless someone is actually demanding flow from the tank (200). As a demand for flow from the tank (200) presumably means that the user missed the indicators (601), (603), and/or (605) which indicate the tank (200) should not be used, a visual indicator may be insufficient. Thus, an audible indicator will generally be used as well. A visual indicator (607) may also be provided when the audible indicator is in use to provide further indications that the tank (200) should not be used.

While FIG. 6 provides for an audible alarm combined with a visual alarm, it should be recognized that other forms of alarms including tactile alarms, different audible or visual alarms, or other alarms may be provided. In an embodiment, the alarm may also be indicated, via a communications network or similar structure to a remote location. For example, a company responsible for filling the tank (200) could be provided with an indication that the tank is empty so they can come get it and refill it. To assist in such refill, the system could also communicate via the network the location of the tank (200) to assist in location.

It should be recognized that FIGS. 5 and 6 provide for only exemplary alarm situations. Other alarm situations can be provided with both audible alarms and specific visual indicators (such as indicator (605)). These can occur in situations such as when a battery (361) needs to be replaced in the system (100), when a malfunction has occurred and the system (100) requires service, or when the system (100) is outdated and requires a software update in order to function correctly and safely. Similarly, a different alarm mode can be provided when the gas specific connection (303) is being used. In this case, the flow rate from the tank (200) may be high enough that a regular alarm would be triggered because the tank (200) is emptying quickly. However, when the tank (200) is being used in this mode, the regular alarm mode may be disabled as a high flow rate is expected and therefore rapid discharge of the tank is not concerning.

Figure 7:
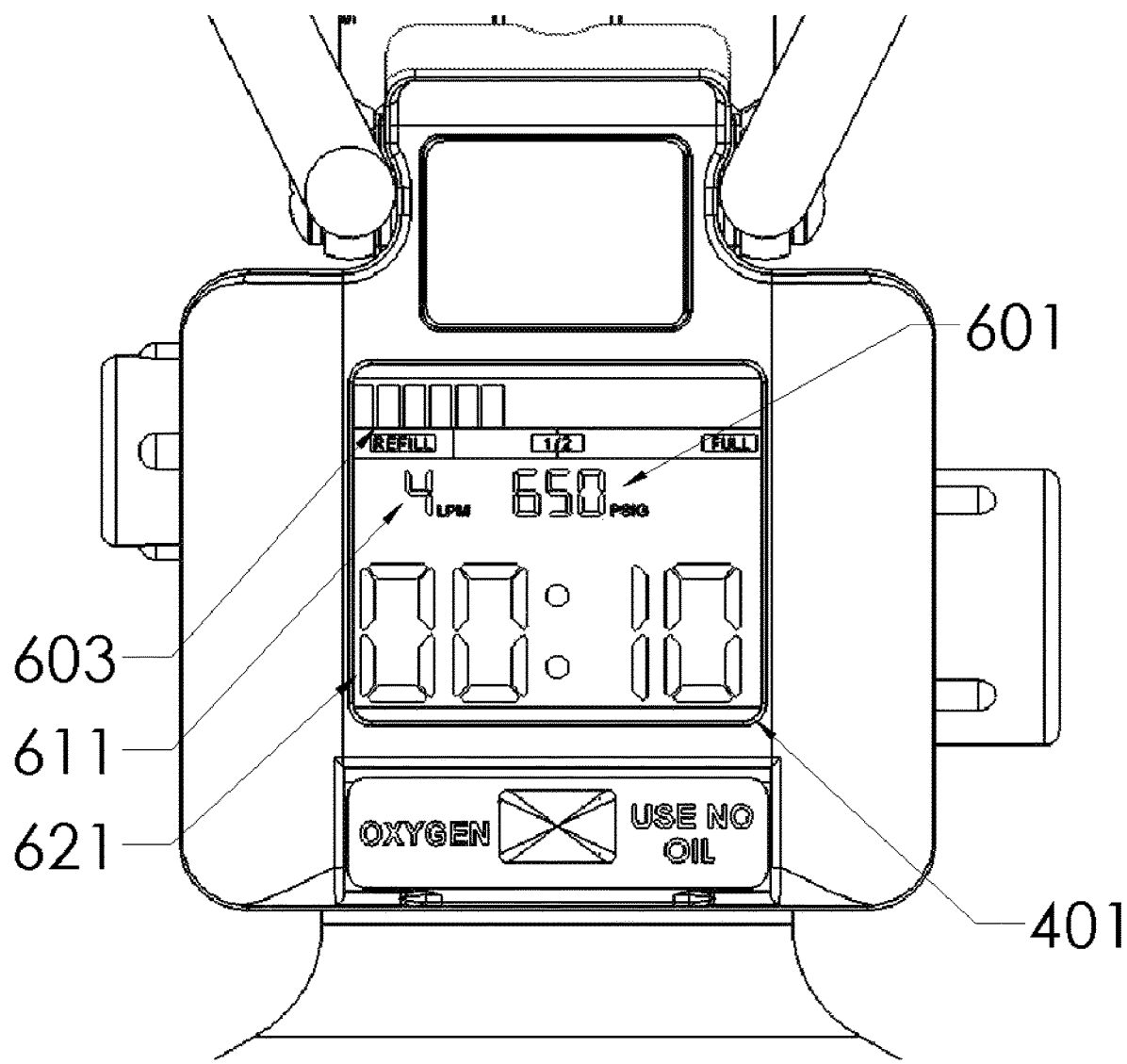
FIG. 7 shows an embodiment of a screen display of a mostly empty tank dispensing gas and displays pressure, flow rate, and remaining time of gas in tank.
Figure 8:
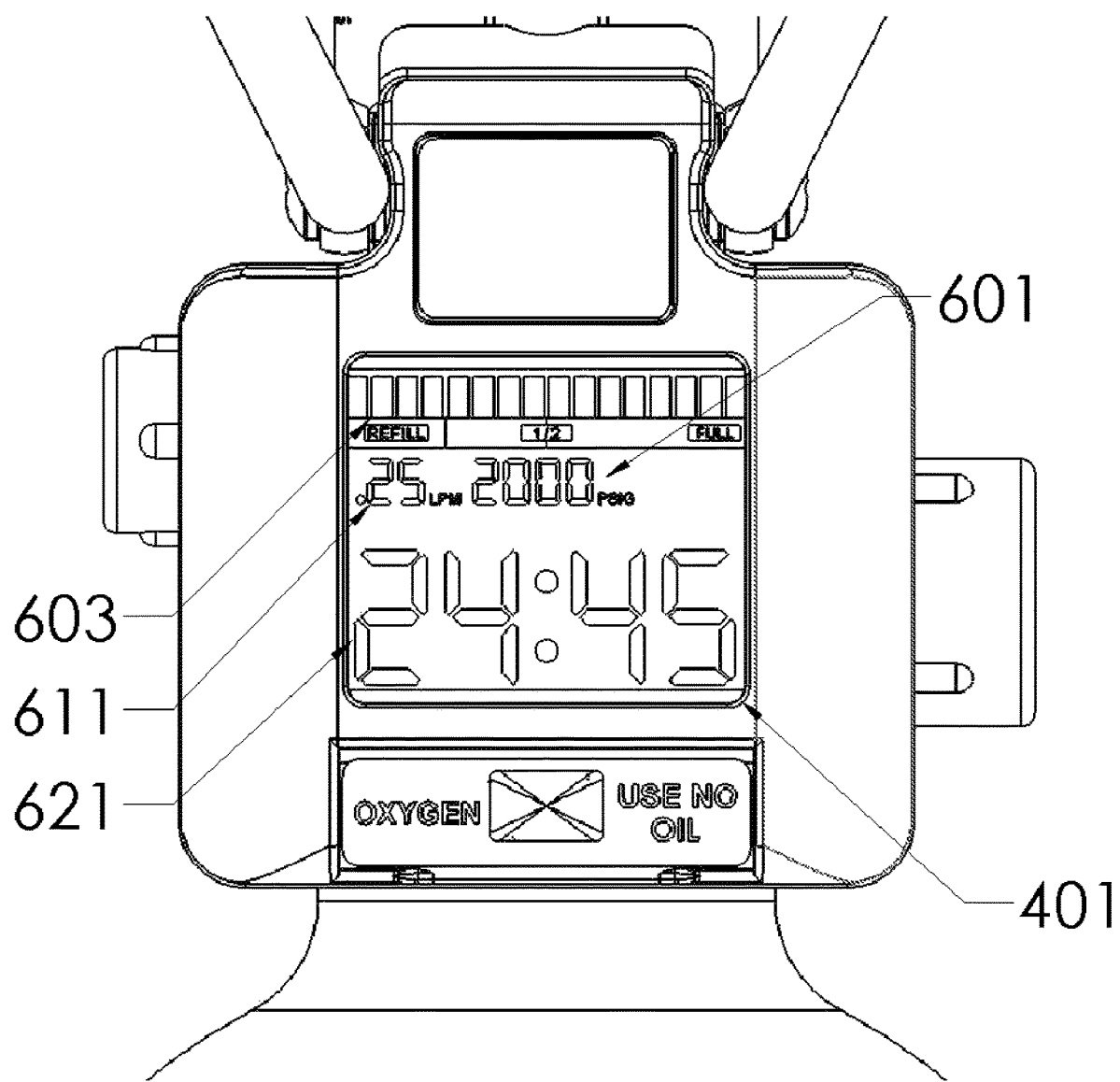
FIG. 8 shows an embodiment of a screen display of a full tank dispensing gas and displays pressure, flow rate, and remaining time of gas in tank.
Figure 9:
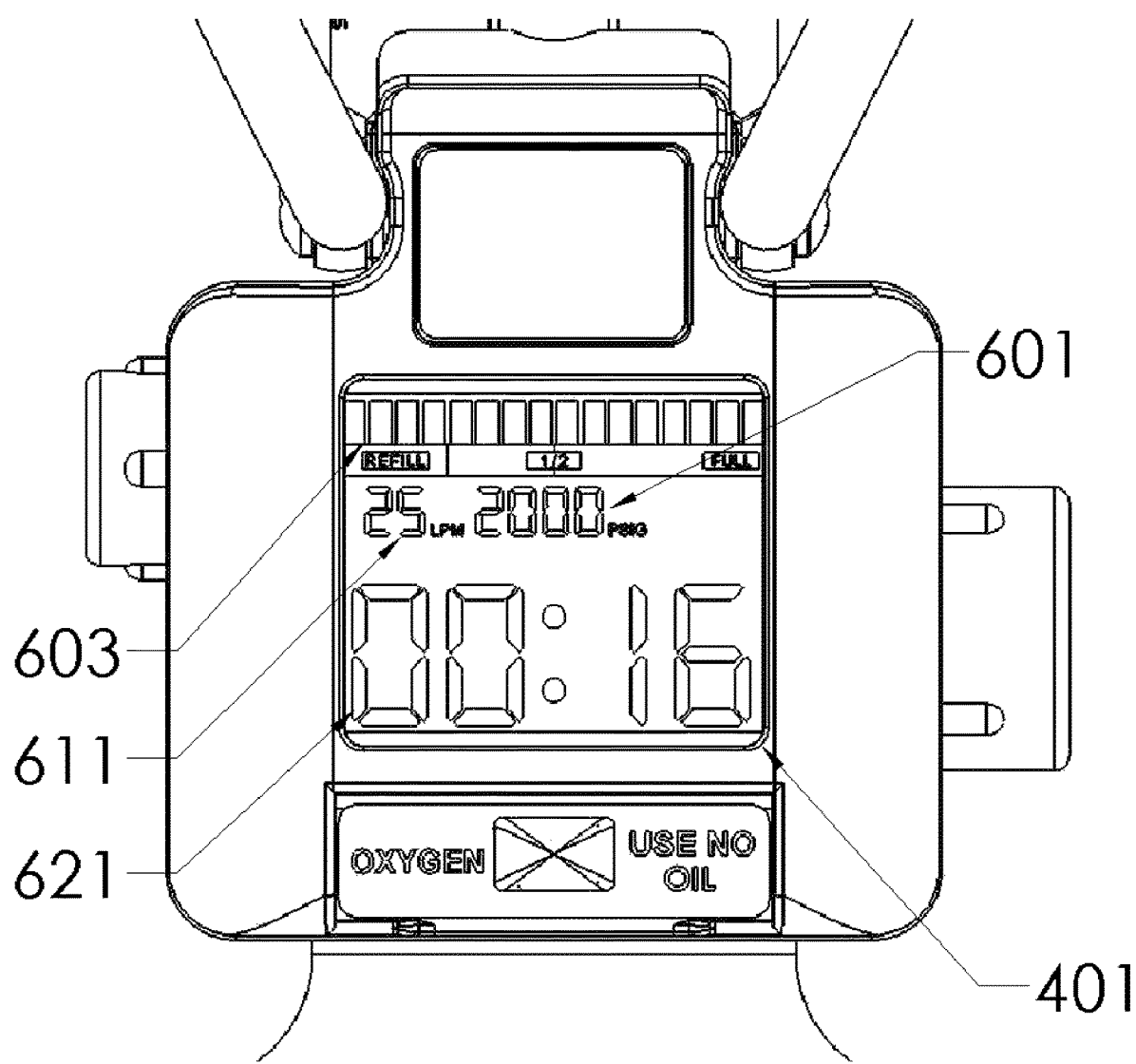
FIG. 9 shows an embodiment of a screen display of a full tank dispensing gas at a much higher flow rate compared to FIG. 8.

While the above has contemplated possible displays (401) when the system (100) is not in use, or should not be in use, FIGS. 7 through 9 provide displays (401) that would be provided in normal operation. In the first "Therapy Mode" which is the standard operation using output (301), the outlet (303) and/or gas-specific refill connections are closed and the barbed outlet fitting is delivering gas (293) to the end user by means of a cannula, as previously discussed. In this case the selector knob (201) has thus been turned to a particular flow rate and that rate of gas (293) is presumably flowing through the fitting (301). The display (401) in this case shows the pressure (601) in the tank (200) along with the graphical display (603). However, it also now shows the selected flow rate (611) and the duration of gas left in hours and minutes (621). As can be seen, the full tank (200) operating at a lower flow rate of FIG. 8 has substantially more time remaining than the mostly empty tank with a higher rate of FIG. 7. Similarly, the very high flow rate being used with a full tank (200) as in FIG. 9 has substantially less time than the full tank of FIG. 8.

Figure 10:
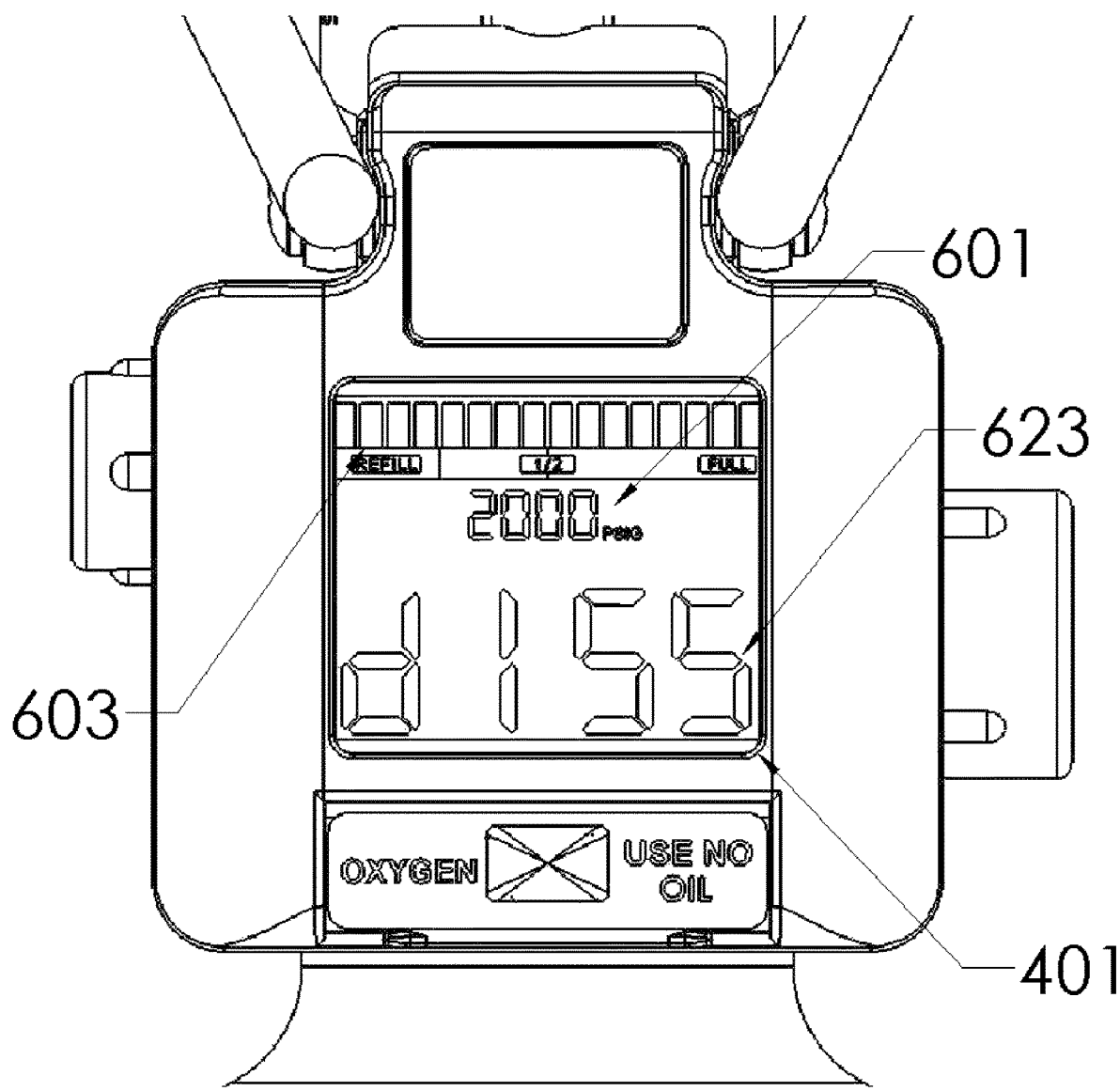
FIG. 10 shows an embodiment of a screen display of a full tank dispensing using the alternative connector in a very high flow rate application.

A variation on the above mode comprises a second "Therapy Mode," but this for the gas-specific outlet fitting (303) and is shown in FIG. 10. In this case, the display (401) may be generally the same as it was in FIGS. 7 through 9. However, the gas-specific connection (303) is open and the knob (201) will generally be in a particular position. In this case, the display (401) may display an indicator (623) that the gas specific outlet (303) is being used. In the embodiment of FIG. 10, no time to discharge is indicated, only the remaining pressure (601), but this is not required and the time of operation may be displayed. Further, the display (401) may also include other specialized display messages (like message (623)) to indicate that the alternative output (303) is in use or to provide additional information.

Figure 11:
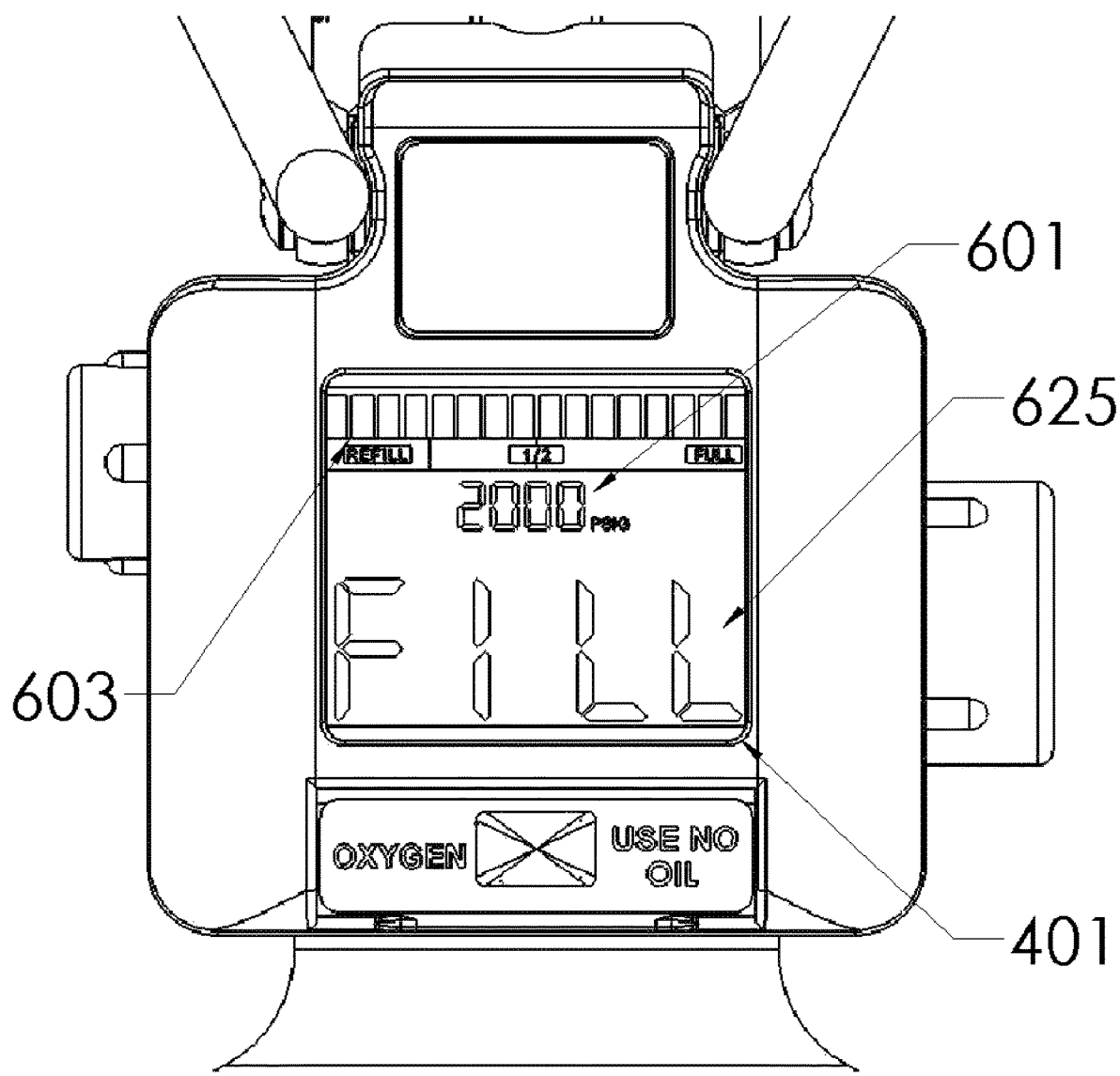
FIG. 11 shows an embodiment of a screen display of a tank during a refilling procedure.

Another mode of operation can be a purge and refill mode. In this mode, the tank (200) is "empty" and is being purged of all remaining gas (293) to be completely refilled. In this situation, while the tank (200) is technically in an alarm situation, as the tank (200) is purging gas (293) while "empty", this is not a situation where the alarm mode is usually desired. In this case, the tank (200) is specifically being purged for the purpose of being refilled and is not being used with a patient. The purge and refill mode will generally be accessed via an override button or switch which indicates that this mode is in effect to the controller (403). The override switch will often be selected through an action which is not generally known to the end user, but is only known by refill technicians. In this way, the alarms can be silenced while the tank (200) is being purged and refilled making it easier to purge and refill the tank without having to listen to alarms, but does not allow a less knowledgeable user to silence a needed alarm. FIG. 11 provides for an embodiment of a purge/refill display where the special filling nature of the situation can be indicated (625). This can be particularly useful where the standby alarm mode of FIG. 5 is present as an end user can simply turn the knob (201) on the tank (200) to standby which would silence any audible alarms if the tank (200) is not currently needed.

Figure 12:
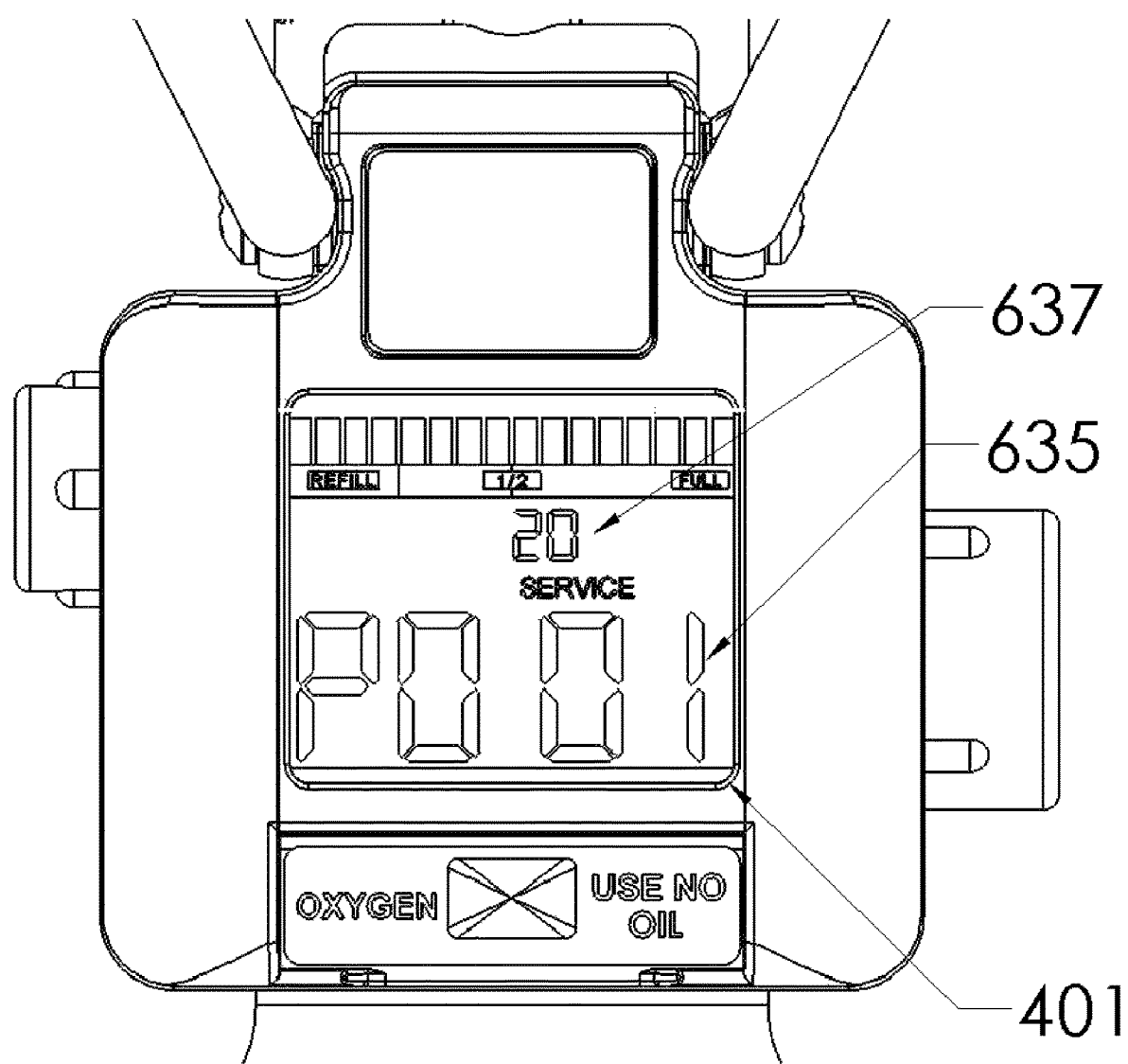
FIG. 12 shows an embodiment of a screen display of a tank in service mode.

As shown in FIG. 12, there may also be provided a "service mode". This mode will commonly be used to indicate to a user a multitude of information about the system (100). In the embodiment of FIG. 12, an alpha-numerical code (635) indicates a specific system feature of the system (100). In addition to the alpha-numeric code (635) for a feature, there is a correlating value (637) for that specific feature. In this embodiment the alpha-numerical code (635) represents an inquiry into the software/firmware version and its value (637) is version 20. The alpha-numeric code (635) and value (637) can reference, but are not limited to, items such as battery (361) percentage, service history and component status.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A system for determining the available duration of a gas in a gas cylinder comprising:
a gas cylinder containing a gas;
a gas outlet connector;
a regulator in fluid communication with said gas cylinder and said gas outlet connector, said regulator controlling the rate at which said gas flows from said gas cylinder to said gas outlet connector;
a selector knob for selecting a flow rate from a plurality of flow rates;
a spring plunger connected to said selector knob and having a position corresponding to said selected flow rate;
a potentiometer detecting a location of said spring plunger;
a pressure sensor detecting the pressure of said gas in said gas cylinder; and
a processor configured to:
receive from said potentiometer a signal indicating said location of said spring plunger, detecting said selected flow rate, and causing said detected flow rate to be displayed on a display;
receive said detected gas pressure from said pressure sensor and cause said received gas pressure to be displayed on said display;
calculate an estimated duration of the remaining supply of said gas in said gas cylinder based at least in part on said detected gas pressure and said selected flow rate;
cause said calculated estimated duration to be displayed on said display;
initiate a first audible alarm if said calculated duration of said gas supply is below a first preset duration; and
initiate a second audible alarm if said calculated duration of said gas supply is below a second preset duration.

2. The system of claim 1, wherein said gas cylinder is a high-pressure medical cylinder.

3. The system of claim 1, wherein said calculated estimated duration is further based at least in part on the volume of said gas cylinder.

4. The system of claim 3, wherein said calculated estimated duration is further based at least in part on the type of gas in said gas cylinder.

5. The system of claim 1 wherein said a plurality of flow rate positions comprises positions on a continuously variable flow rate.

6. A system for determining the available duration of gas in a cylinder comprising:
a gas cylinder;
a gauge system removeably attached to said gas cylinder, comprising;
a regulator body enclosing an internal space;
a gas outlet connector in a wall of said regulator body and adapted for connecting an external hose to said gas outlet connector, said gas outlet connector in communication with said gas cylinder via said internal space;
a gas flow selection subsystem disposed within said body and adapted to allow gas flow from said gas cylinder to said gas outlet connector at a selected gas flow rate;
a rotary membrane potentiometer disposed within said regulator body and having a conductive annular surface having a linearly varying resistance around its circumference, said linear varying resistance including a resistance range corresponding to said selected gas flow rate;
a spring plunger disposed within said regulator body in mechanical contact with said conductive annular surface at a selected position, said linear varying resistance at said selected position being within said resistance range; and
a selector knob rotatably disposed on the exterior of said regulator body and user-adjustable to a plurality of flow rate positions, said selector knob being mechanically connected to said gas flow selection subsystem such that when selector knob is in a selected flow rate position in said plurality of flow rate positions;
wherein said gas flow selection subsystem allows gas flow from said gas cylinder to said gas outlet connector at said selected gas flow rate; and
wherein said spring plunger contacts said annular surface at said selected position;
a pressure sensor disposed in said regulator body; and a controller disposed in said regulator body and in electrical communication with said potentiometer, said controller comprising a processor configured to execute the steps of:
- receive from said rotary membrane potentiometer an electrical signal indicative of said selected position;
- convert said received electronic signal to said flow rate, said conversion being based upon said electrical resistance of said received electronic signal being in said resistance range; and
- cause to be displayed on a display an indication of said flow rate;
- receive from said pressure sensor a second electrical signal indicative of the gas pressure in said gas cylinder;
- cause to be displayed on said display an indication of said gas pressure indicated by said received second electrical signal;
- calculate, based at least in part on said indicated gas pressure and at least in part on said converted flow rate, an estimated duration of the gas supply in said gas cylinder;
- cause to be displayed on said display said calculated duration of said gas supply;
- initiate a first audible alarm if said calculated duration of said gas supply is below a first preset duration; and
- initiate a second audible alarm if said calculated duration of said gas supply is below a second preset duration.

7. The system of claim 6, wherein said gas cylinder is a high-pressure medical cylinder.

8. The system of claim 7, wherein said gas flow selection subsystem comprises a regulator.

9. The system of claim 8, wherein:
- said gas flow selection subsystem further comprises a plate rotatably disposed at least partially in a channel between said gas cylinder and said gas outlet connector, said plate having an orifice configured to allow gas flow through said orifice at said selected gas flow rate;
- said mechanical connection of said selector knob to said gas flow selection subsystem being operable to cause said orifice to be disposed in said channel when said knob is in said selected flow rate position such that gas flowing from said gas cylinder to said gas connector passes through said orifice at said selected gas flow rate.

10. The system of claim 9, wherein said calculated estimated duration is further based at least in part on the volume of said gas cylinder.

11. The system of claim 10, wherein said calculated estimated duration is further based at least in part on the type of gas in said gas cylinder.

12. The system of claim 11, wherein said calculated estimated duration is calculated at least in part using the mass of gas remaining in the gas cylinder, said mass being determined at least in part by determining the number of moles of said gas remaining in said gas cylinder using the combined ideal gas law, $pV=nRT$, wherein:
- p is said indicated pressure;
- V is said volume of gas cylinder;
- n is the number of moles of gas in said gas cylinder;
- R is the universal gas constant; and
- T is temperature.

13. The system of claim 12, wherein said temperature is an assumed constant temperature.

14. The system of claim 12, wherein:
- the system further comprises a temperature sensor disposed in said regulator body and in electrical communication with said controller;
- said controller processor is further configured to execute the step of receiving from said temperature sensor a third electrical signal indicative of the temperature in said gas cylinder; and
- said temperature is said indicated temperature.

15. The system of claim 6 further comprising:
- a second gas outlet connector in said wall of said regulator body, said second gas outlet connector also adapted for connecting an external hose to said gas outlet connector and said gas outlet connector also in communication with said gas cylinder via said internal space;
- wherein, said gas flow selection subsystem is adapted to allow gas flow from said gas cylinder to said second gas outlet connector at a higher selected gas flow rate.

16. The system of claim 6 wherein said a plurality of flow rate positions comprises positions on a continuously variable flow rate.

* * * * *